United States Patent
Fallon et al.

(10) Patent No.: US 7,415,540 B2
(45) Date of Patent: Aug. 19, 2008

(54) SCHEDULING PROCESSING THREADS

(75) Inventors: Michael Fallon, Mendon, MA (US);
Makaran Raghunandan, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 838 days.

(21) Appl. No.: 10/335,148

(22) Filed: Dec. 31, 2002

(65) Prior Publication Data

US 2004/0128401 A1    Jul. 1, 2004

(51) Int. Cl.
*G06F 15/16*    (2006.01)
(52) U.S. Cl. ...................................... 709/250
(58) Field of Classification Search .................. 709/250
See application file for complete search history.

(56) References Cited

U.S. PATENT DOCUMENTS

| | | | | |
|---|---|---|---|---|
| 5,475,682 A | * | 12/1995 | Choudhury et al. | 370/229 |
| 5,515,538 A | * | 5/1996 | Kleiman | 710/260 |
| 5,909,695 A | * | 6/1999 | Wong et al. | 711/133 |
| 6,338,078 B1 | * | 1/2002 | Chang et al. | 718/102 |
| 6,427,161 B1 | * | 7/2002 | LiVecchi | 718/102 |
| 6,549,930 B1 | * | 4/2003 | Chrysos et al. | 718/104 |
| 6,631,422 B1 | * | 10/2003 | Althaus et al. | 709/250 |
| 2003/0188300 A1 | * | 10/2003 | Patrudu | 717/149 |
| 2005/0132132 A1 | * | 6/2005 | Rosenbluth et al. | 711/108 |

* cited by examiner

*Primary Examiner*—John Fallansbee
*Assistant Examiner*—Alan S Chou
(74) *Attorney, Agent, or Firm*—Fish & Richardson P.C.

(57) ABSTRACT

Scheduling the processing of threads by scheduling a datagram from an input queue among a plurality of input queues to a thread for processing. The scheduling includes computing an output position in an output queue, communicating with a plurality of threads for processing, and assigning the datagram to one of said plurality of threads for processing. After processing the datagram, the processing thread enqueus the datagram in the output queues at the output position specified by the scheduled output position.

26 Claims, 6 Drawing Sheets

SCHEDULING PROCESSING THREADS

BACKGROUND

Datagrams that are received on the same interface and destined for the same interface are required by networking protocols to be transmitted in the order that they were received. For each input port, incoming datagrams are enqueued on an input queue in the order they are received. A processing thread dequeues a datagrams, processes it, and enqueues it on an output queue shared with other processing threads. Examples of datagrams processing includes decryption/encryption, routing, filtering and policing. Several processing threads can be working independently and simultaneously on datagrams from the same input port that are destined for the same output port.

Coherency problems arise whenever it is possible for multiple processing threads to simultaneously access a single resource. Mutual exclusion constructs, such as semaphores are often used to ensure data coherency. Techniques employed for maintaining packet order and data coherency often result in systems which use a disproportionate amount of the system's resources attending to these tasks.

DESCRIPTION OF THE DRAWINGS

FIG. 2 is a block diagram of a microengine unit employed in the hardware-based multithreaded processor of FIG. 1.

DESCRIPTION

Figure 1:
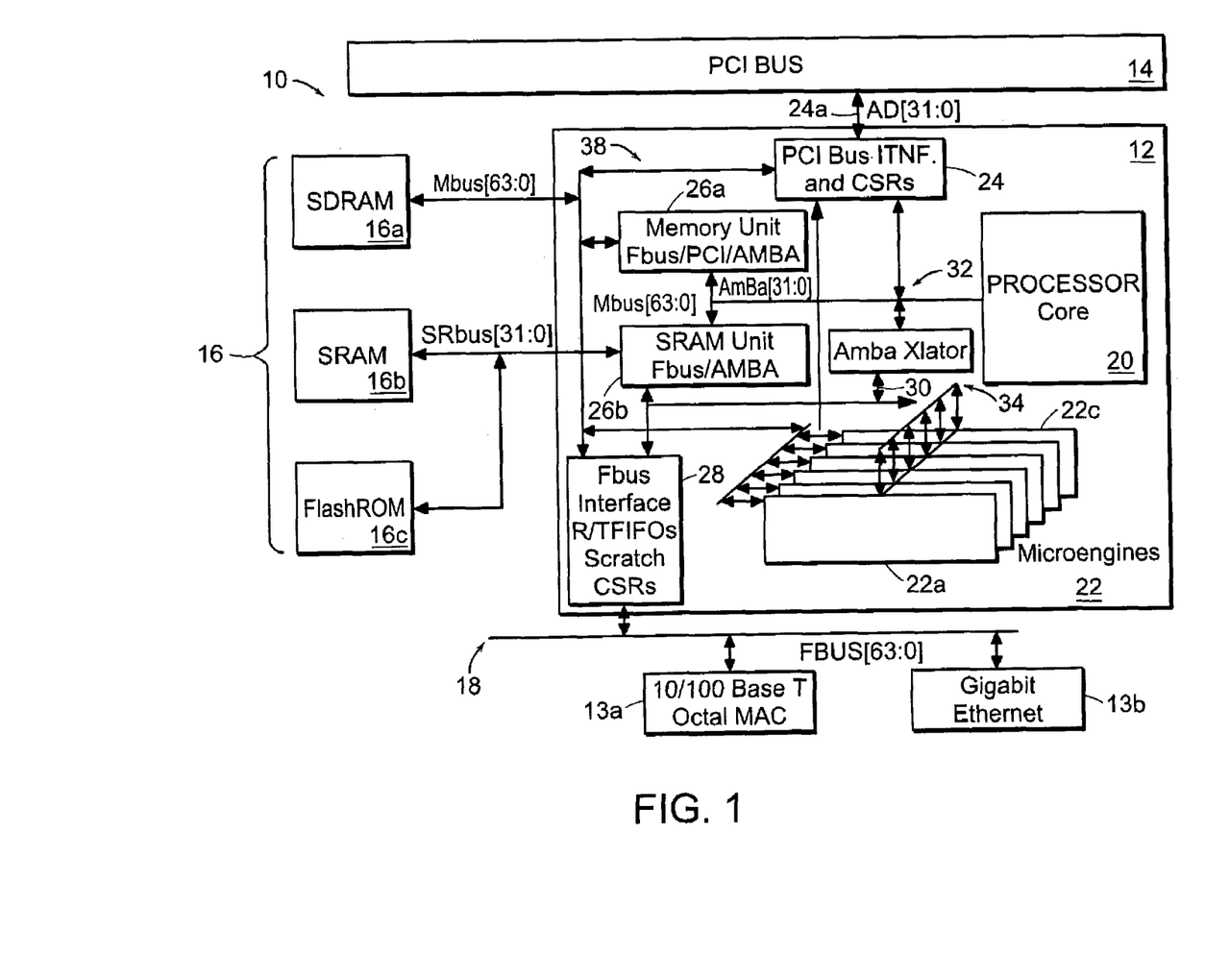
FIG. 1 is a block diagram of a communication system employing a hardware-based multithreaded processor.

Referring to FIG. 1, a communication system 10 includes a parallel, hardware-based multithreaded processor 12. The hardware-based multithreaded processor 12 is coupled to a bus such as a Peripheral Component Interconnect (PCI) bus 14, a memory system 16 and a second bus 18. The system 10 is especially useful for tasks that can be broken into parallel subtasks. Specifically hardware-based multithreaded processor 12 is useful for tasks that are bandwidth oriented rather than latency oriented. The hardware-based multithreaded processor 12 has multiple microengines 22 each with multiple hardware controlled program threads that can be simultaneously active and independently work on a task.

The hardware-based multithreaded processor 12 also includes a central controller 20 that assists in loading microcode control for other resources of the hardware-based multithreaded processor 12 and performs other general purpose computer type tasks such as handling protocols, exceptions, extra support for packet processing where the microengines pass the packets off for more detailed processing such as in boundary conditions. In one embodiment, the processor 20 is a Strong Arm® (Arm is a trademark of ARM Limited, United Kingdom) based architecture. The general purpose microprocessor 20 has an operating system. Through the operating system the processor 20 can call functions to operate on microengines 22a-22f. The processor 20 can use any supported operating system preferably a real time operating system. For the core processor implemented as a Strong Arm architecture, operating systems such as, Microsoft NT real-time, VXWorks and μCUS, a freeware operating system available over the Internet, can be used.

The hardware-based multithreaded processor 12 also includes a plurality of microengines 22a-22f. Microengines 22a-22f each maintain a plurality of program counters in hardware and states associated with the program counters. Effectively, a corresponding plurality of sets of program threads can be simultaneously active on each of the microengines 22a-22f while only one is actually operating at one time.

In one embodiment, there are six microengines 22a-22f, each having capabilities for processing four hardware program threads. The six microengines 22a-22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

Hardware context swapping enables other contexts with unique program counters to execute in the same microengine. Hardware context swapping also synchronizes completion of tasks. For example, two program threads could request the same shared resource e.g., SRAM. Each one of these separate units, e.g., the FBUS interface 28, the SRAM controller 26a, and the SDRAM controller 26b, when they complete a requested task from one of the microengine program thread contexts reports back a flag signaling completion of an operation. When the flag is received by the microengine, the microengine can determine which program thread to turn on.

As a network processor, e.g., a router, the hardware-based multithreaded processor 12 interfaces to network devices such as a media access controller device e.g., a 10/100BaseT Octal MAC 13a or a Gigabit Ethernet device 13b coupled to other physical layer devices. In general, as a network processor, the hardware-based multithreaded processor 12 can interface to any type of communication device or interface that receives/sends large amounts of data. The network processor can include a router 10 in a networking application route network packets amongst devices 13a, 13b in a parallel manner. With the hardware-based multithreaded processor 12, each network packet can be independently processed. 26.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 12 to the FBUS 18. The FBUS 18 is a 64-bit wide FIFO bus, used to interface to Media Access Controller (MAC) devices. The processor 12 includes a second interface e.g., a PCI bus interface 24 that couples other system components that reside on the PCI 14 bus to the processor 12. The units are coupled to one or more internal buses. The internal buses are dual, 32 bit buses (i.e., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB bus (Advanced System Bus) that couples the processor core 20 to the memory controllers 26a, 26b and to an ASB translator 30 described below. The ASB bus is a subset of the so called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Each of the microengines 22a-22f includes an arbiter that examines flags to determine the available program threads to be operated upon. The program thread of the microengines 22a-22f can access the SDRAM controller 26a, SDRAM controller 26b or FBUS interface 28. The SDRAM controller 26a and SDRAM controller 26b each include a plurality of queues to store outstanding memory reference requests. The queues either maintain order of memory references or arrange memory references to optimize memory bandwidth.

Although microengines 22 can use the register set to exchange data. A scratchpad memory is also provided to permit microengines to write data out to the memory for other microengines to read. The scratchpad is coupled to bus 34.

Referring to FIG. 2, an exemplary one of the microengines 22a-22f, e.g., microengine 22f is shown. The microengine includes a control store 70 which, in one implementation, includes a RAM of here 1,024 words of 32 bits. The RAM stores a microprogram that is loadable by the core processor 20. The microengine 22f also includes controller logic 72. The controller logic includes an instruction decoder 73 and program counter (PC) units 72a-72d. The four micro program counters 72a-72d are maintained in hardware. The microengine 22f also includes context event switching logic 74. Context event logic 74 receives messages (e.g., $SEQ\_\#\_EVENT_{RESPONSE}$; FBI_EVENT_RESPONSE; SRAM_EVENT_RESPONSE; $SDRAM\_EVENT\_RE$-SPONSE; and ASB_EVENT_RESPONSE) from each one of the shared resources, e.g., SRAM 26a, SDRAM 26b, or processor core 20, control and status registers, and so forth. These messages provide information on whether a requested task has completed. Based on whether or not a task requested by a program thread has completed and signaled completion, the program thread needs to wait for that completion signal, and if the program thread is enabled to operate, then the program thread is placed on an available program thread list (not shown). The microengine 22f can have a maximum of, e.g., 4 program threads available.

In addition to event signals that are local to an executing program thread, the microengines 22 employ signaling states that are global. With signaling states, an executing program thread can broadcast a signal state to the microengines 22. The program thread in the microengines can branch on these signaling states. These signaling states can be used to determine availability of a resource or whether a resource is due for servicing.

The context event logic 74 has arbitration for the four (4) program threads. In one embodiment, the arbitration is a round robin mechanism. Other techniques could be used including priority queuing or weighted fair queuing. The microengine 22f also includes an execution box (EBOX) data path 76 that includes an arithmetic logic unit 76a and general purpose register set 76b. The arithmetic logic unit 76a performs arithmetic and logic operation as well as shift operations. The registers set 76b has a relatively large number of general purpose registers. In this implementation there are 64 general purpose registers in a first bank, Bank A and 64 in a second bank, Bank B. The general purpose registers are windowed so that they are relatively and absolutely addressable.

The microengine 22f also includes a write transfer register stack 78 and a read transfer stack 80. These registers are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74 which will then alert the program thread that the data is available or has been sent. Both transfer register banks 78 and 80 are connected to the execution box (EBOX) 76 through a data path. In one implementation, the read transfer register has 64 registers and the write transfer register has 64 registers.

Each microengine 22a-22f supports multi-threaded execution of multiple contexts. One reason for this is to allow one program thread to start executing just after another program thread issues a memory reference and must wait until that reference completes before doing more work. This behavior maintains efficient hardware execution of the microengines because memory latency is significant.

Special techniques such as inter-thread communications to communicate status and a thread_done register to provide a global program thread communication scheme is used for packet processing. The thread_done register can be implemented as a control and status register. Network operations are implemented in the network processor using a plurality of program threads e.g., contexts to process network packets. For example, scheduler program threads could be executed in one of the microprogram engines e.g., 22a whereas, processing program threads could execute in the remaining engines e.g., 22b-22f. The program threads (processing or scheduling program threads) use inter-thread communications to communicate status.

Program threads are assigned specific tasks such as receive and transmit scheduling, receive processing, and transmit processing, etc. Task assignment and task completion are communicated between program threads through the inter-thread signaling, registers with specialized read and write characteristics, e.g., the thread-done register, SRAM 16b and data stored in the internal scratchpad memory resulting from operations such as bit set, and bit clear.

Processing of network packets can use multiple program threads. The network processing multiple program threads involves a scheduler. A scheduler thread coordinates amounts of work to be done, the type of work, and sequence of work by processing program threads. The scheduler program thread assigns tasks to processing program threads and in some cases processing program threads can assign tasks to other processing program threads. For instance, a scheduler determines which ports need service and assigns and coordinates tasks to processing program threads to overcome inherent memory latency by processing multiple program threads in parallel. Some processing threads may specialize in specific types of processing for efficiency reasons. The scheduling thread directs only that type of task to that processing thread that handles that type of task. The scheduling thread also assigns locations where input data is obtained from and where results are deposited.

Figure 3:
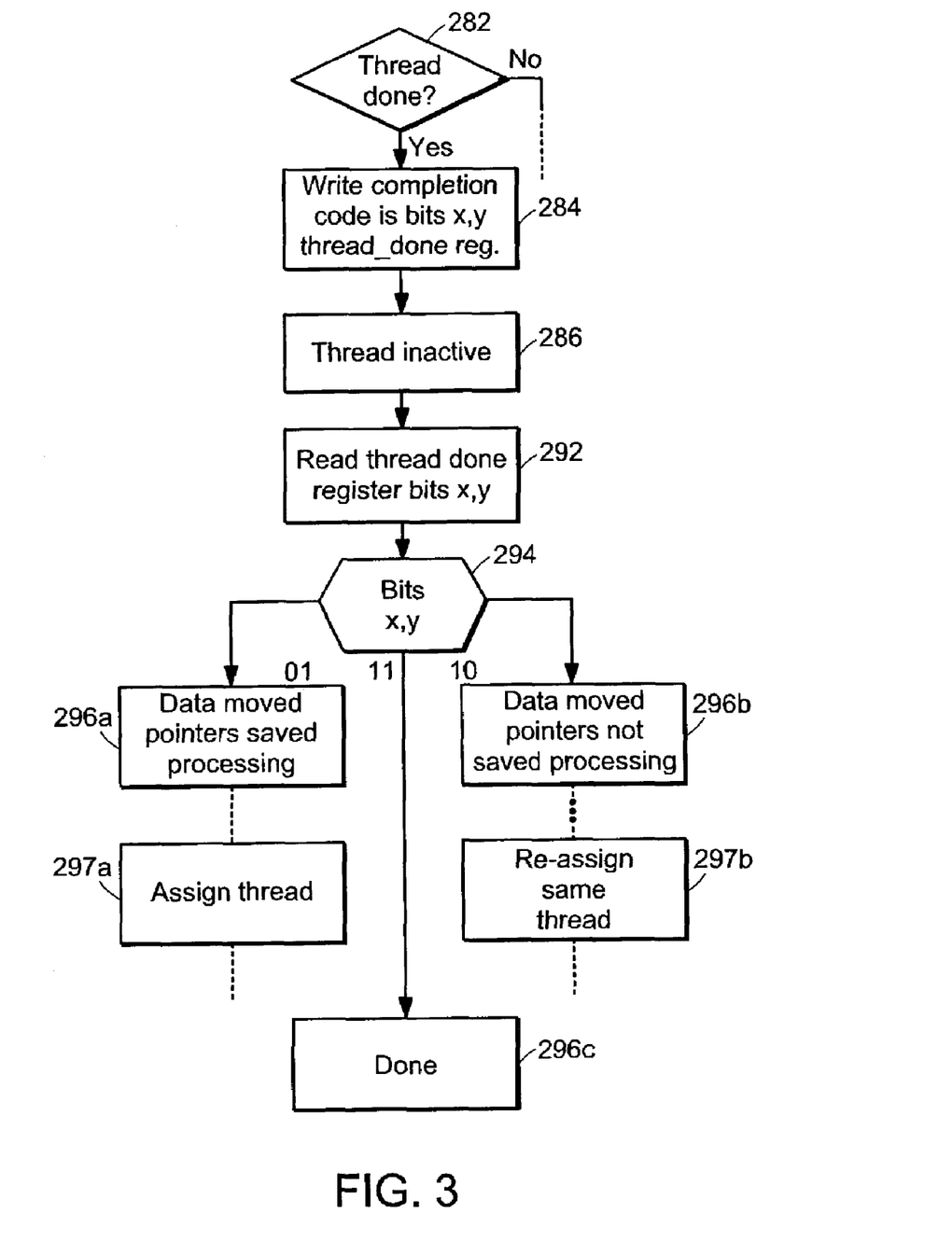
FIG. 3 is a flow chart of a program thread status reporting process.

FIG. 3 involves the process used to communicate between the scheduler thread and the processing threads. The thread_done register is on the FBI 28 and is a register where bits can be set from different program threads. Each program thread can use, e.g., two bits to communicate its status to other program threads. Also one scheduler program thread can read 292 the status of its processing program threads.

Upon completion of a receive task, 282 a processing thread writes 284 a completion code into the "thread_done" register. The processing thread becomes inactive 286 after writing the thread_done register. That processing thread waits for another signal from the FBI that indicates another datagrams/packet has been assigned. Program threads 1-16 have 2 bit fields for "thread_done__1", and program threads 17-24 have 2 bit fields for "thread_done__2". The 2 bit field allows a program thread to communicate different levels of task completion.

For example, the scheduler can use the two bit status "01" to indicate that data was moved to SDRAM, processing of packet is still in progress and pointers were saved; bits 10 can indicate that data was moved to SDRAM, processing of packet is still in progress and pointers were not saved; and bits 11 can indicates packet processing is completed. Thus, the states 296a can be used by the receiver scheduler program thread to assign 297a another thread to process a task when data becomes available, whereas, states 296b can be used by the scheduler to assign 297b the same thread to continue processing when the data is available.

The exact interpretation of the message can be fixed by a software convention determined between a scheduler program thread and processing program threads called by the scheduler program thread. That is the status messages can change depending on whether the convention is for receive, as above, transmit, and so forth. In general, the status messages include "busy", "not busy", "not busy but waiting." The status message of "not busy, but waiting" signals that the current program thread has completed processing of a portion of a packet and is expected to be assigned to perform a subsequent task on the packet when data is made available. It can be used when the program thread is expecting data from a port and has not saved context so it should process the rest of that packet.

The scheduler program thread reads the "thread done" register to determine the completion status of tasks it assigned to other program threads. The "thread done" register is implemented as a write one to clear register, allowing the scheduler to clear just the fields it has recognized.

Figure 4:
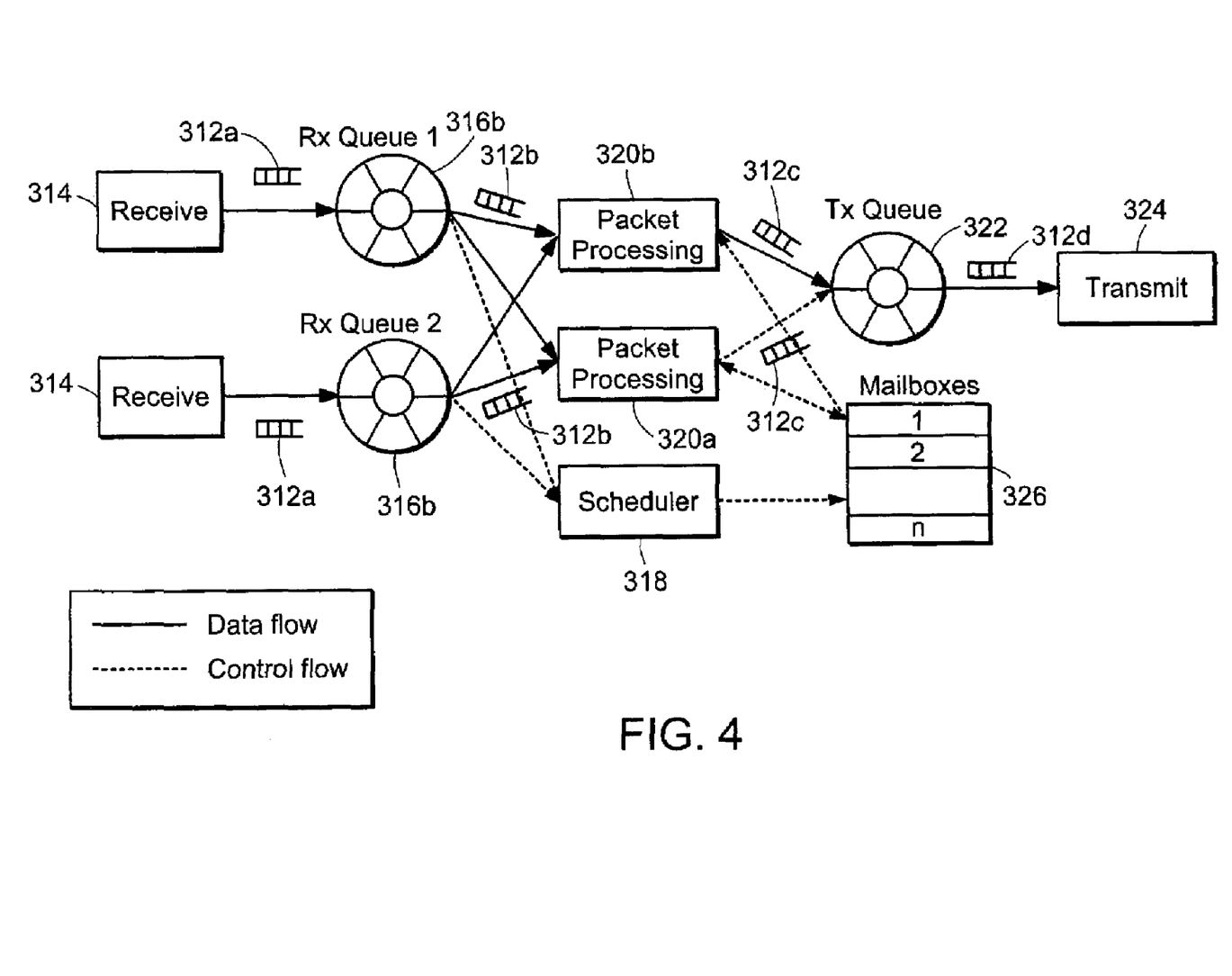
FIG. 4 is a diagram of the scheduler management of threads.

Referring to FIG. 4, datagrams 312a are received via FBI interface 28. The received datagrams 312a are enqueued to input queue 316a and input queue 316b in the order that they are received from FBI interface 28. The input queue can be implemented as a) software based linked list b) software based circular buffer or ring or c) a combination of hardware. The input queues, 316a and 316b, increment a corresponding counter in the memory of the input queue 316a or 316b to signal the scheduler thread 318 that a new datagrams 312a has been enqueued. The scheduler 318 locates a packet processing thread 320a or 320b that can accept a new datagrams processing assignment. The scheduler thread 318 assigns the processing thread 320a or 320b a specific datagrams 312b to process, as well as a specific output queue 322 location to enqueue to upon completion of datagrams 312b processing. The processing threads 320a and 320b work on the datagrams 312b assigned to it and dequeue the processed datagrams 312b to the assigned output queue 322. The output queue 322 receives the processed datagrams 312c in the location instructed by the scheduler 318 and increments a corresponding counter in output queue's 322 memory to signal the scheduler thread 318 that the datagrams 312c has been dequeued. The output queue 322 transmits the ordered, processed datagrams 312d to bus 28. The scheduler 318 communicates its message to the processing threads 320a and 320b using an inter-thread communication scheme such as mailbox 326. The processing threads 320a and 320b can in turn use a similar mechanism to communicate their state (busy, completed task etc) to the scheduler 318.

For multiple output queues the scheduler maintains an enqueue pointer (common to all the output queues) and a skip indicator. The scheduler assigns the enqueue pointer to a processing thread. The scheduler also assigns a skip indicator to the location in the output queue. The other processing threads will move to the next location without any processing if it sees a skip indicator. The processing thread assigned to the enqueue pointer enqueues the datagrams into that output queue at the location instructed by the enqueue pointer.

The multi-threaded processing system described is not limited to processing of datagrams. The principles described can be used for other data that would be handled by a multi-threaded processing system. The system described could be used in network processing for processing of packets transmitted and received via the Internet. A variety of packets and similar pieces of data can be processed using the described multi-threaded processing system.

The multi-threaded processing maintains datagrams/packet order and data integrity through the use of a scheduler thread 318. The scheduler thread 318 determines which datagrams the processing threads 320a and 320b work on and a location where the processing threads place data when the processing threads are done.

The scheduler thread 318 can maintain a strict First In First Out (FIFO) order of the datagrams/packets 312a per interface as datagrams/packets are received, without requiring processing threads to wait for other threads to complete. While the scheduler 318 would normally maintain a FIFO order per interface, the scheduler 318 could maintain a different datagrams/packet ordering. For example, the packet 312a could include priority information. The schedule 318 could determine the ordering of processing based on the priority information included in the packet. The scheduler 318 could receive priority information when the packet 312a is enqueued and compute an output location based on the priority information.

The scheduler maintains datagrams order by instructing the processing threads exactly where to place output in the output queue when processing is complete. Queue coherency is maintained by limiting queue management to one centralized location, the scheduler. The scheduler finds the input queue(s) that have a packet to be processed. This can be accomplished using a scheme such as a packet counter for each queue, or, a bit vector with a bit for each queue to indicate the queue is empty/non-empty. The scheduler finds the processing threads that are free by reading an inter-thread mailbox such as the THREAD_DONE control and status register. The scheduler computes dequeue pointer in the input queue, and, the enqueue pointer for the output queue. The scheduler writes an assignment to the packet processing thread indicating the dequeue pointer, enqueue pointer, and input and output queue IDs. Alternatively, the scheduler can dequeue the datagrams from the input queue and pass a pointer to the dequeued packet.

Figure 5:
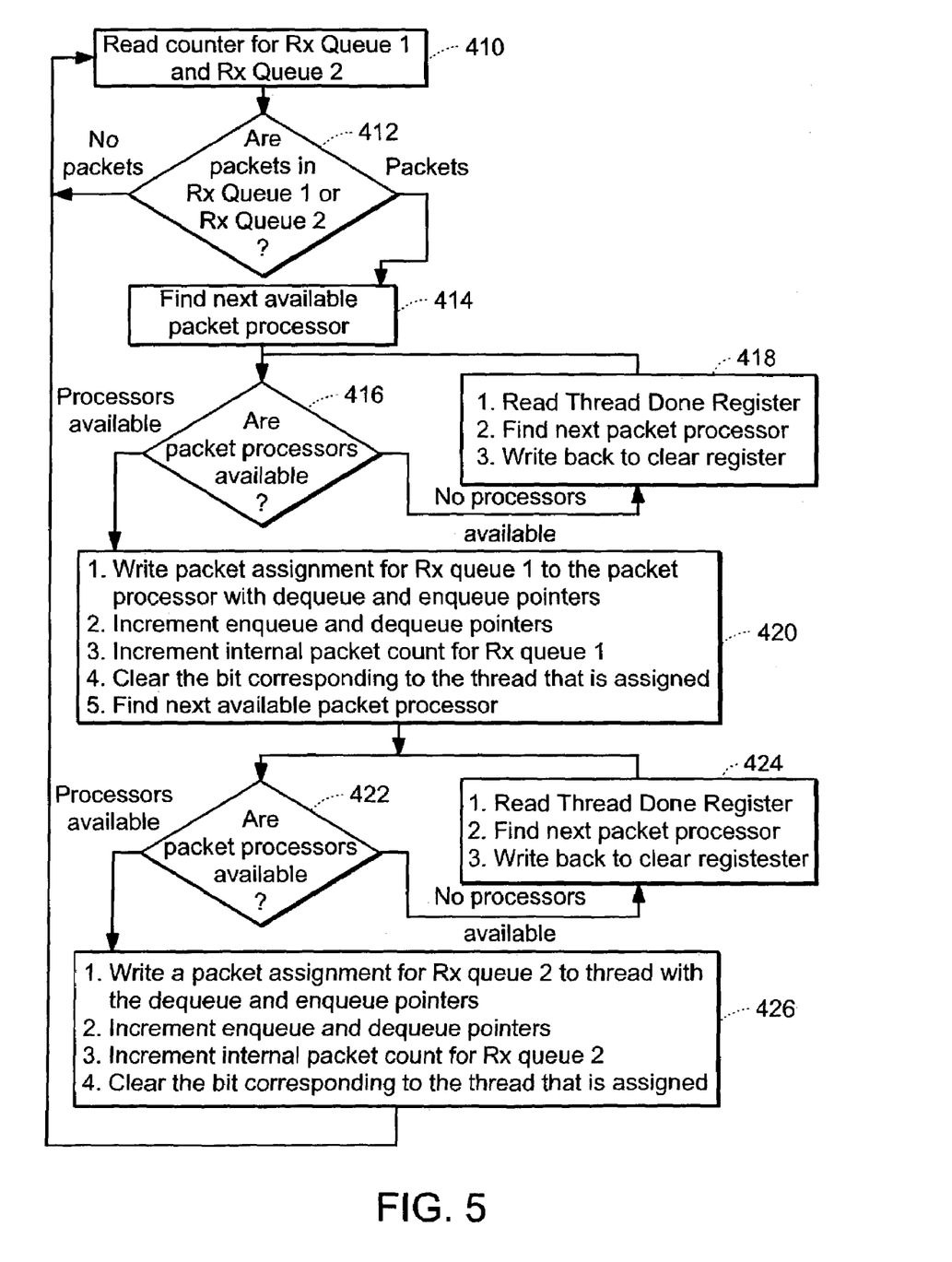
FIG. 5 is a flowchart of code instruction for the scheduler.

Referring to FIG. 5, scheduler thread code starts a scheduling process by reading 410 the counter for input queue 1 and input queue 2. The scheduler 412 identifies a packet in either input queue 1 or input queue 2. If the scheduler does not locate a packet it proceeds back to reading the counter 410. If the scheduler locates a packet, the scheduler checks 414 the availability of the first thread processors to handle a packet located in input queue 1. The scheduler identifies 416 whether or not the first processor thread is available.

If the first processor was unavailable 414, the scheduler checks 418 the Thread_done register or mailbox and locates the next available processor. Once a processor is available the scheduler clears the packet processor's register or mailbox and proceeds back to 416.

If a processor is available, the scheduler identifies the available processor and writes 420 packet assignment from input queue 1 to the processed packet with the dequeue and enqueue pointers that identify the position in the output queue. The scheduler increments 420 the counter in the input queue 1 and the output queue and signals 420 to the mailbox or register specific to the processor that the packet has been enqueued. The scheduler finds 420 the next available packet processor to handle a packet located in input queue 2.

The scheduler identifies 422 whether or not the first packet processor is available. If the first processor is unavailable, the scheduler checks 424 the Thread_done register or mailbox and locates the next available processor. Once a processor is available the scheduler clears the packet processor's register or mailbox.

If a processor is available, the scheduler identifies to the available processor and writes packet assignments from input queue 2 to the processed packet with the dequeue and enqueue pointers that identify the position in the output queue. The scheduler increments the counter in the input queue 2 and the output queue and signals to the mailbox or register specific to the processor that the packet has been enqueued and returns to reading 410 the counter for input queue 1 and input queue 2.

The scheduling of the processing of threads could be implemented in a variety of manners. The scheduling could be performed by a composition of hardware components that perform the task of processing multiple threads. The scheduling could also be performed by software. The scheduling could also be performed by a composition of both hardware and software. The method of device allows dynamic allocation and re-allocation of processing threads. Also, the method provides coherency and packet ordering in a single scheme.

OTHER EMBODIMENTS

Other embodiments are within the scope of the following claims.

What is claimed is:

1. A method for processing a plurality of datagrams, the method comprising:
    executing a scheduling thread to communicate with a plurality of processing threads,
    scheduling processing of a datagram, the datagram having an input location among the plurality of datagrams,
    assigning the datagram to one of the plurality of processing threads, and
    prior to processing the datagram, specifying a location in an output queue for the results from processing the datagram, the output queue being shared by the plurality of processing threads, wherein the location in the output queue is based on the input location of the datagram among the plurality of datagrams;
    processing the datagram using at least one of the plurality of processing threads;
    outputting the processed datagrams in an order that is different from the order in which the datagrams were input for processing; and
    storing the datagram in the output queue based on the specified location.

2. The method of claim 1, wherein the input location comprises an input location of the datagram in an input queue among the plurality of datagrams in the input queue.

3. The method of claim 1, wherein the location in the output queue corresponds to an output location among the plurality of datagrams in the output queue such that the order of the results from processing the datagrams stored in the output queue is the same as the order for the plurality of datagrams in the input queue.

4. The method of claim 1, wherein the scheduling maintains a first in; first out order for datagrams sharing an input and output interface pair.

5. The method of claim 1, wherein communicating is inter-thread by a mailbox.

6. The method of claim 1, wherein the scheduling further comprises:
    incrementing a packet counter to indicate receipt of a new datagram.

7. A device for processing datagrams, the device comprising:
    a scheduler configured to:
        execute a scheduler thread to assign datagrams to processing threads; and
        prior to processing the datagram, determine an output position in at least one output queue for the results from processing the datagrams, the output position for a particular one of the datagrams being based on an input location of the particular one of the datagrams among the datagrams in an input queue; and
    a processor configured to:
        execute multiple packet threads that receive the datagram from the input queue, at least one of the packet threads processing the datagram, and
        dispatch the processed datagram in an order that is different from the order in which the datagrams were input for processing to the output position in the at least one output queue determined by the scheduling thread.

8. The device of claim 7, further comprising: multiple input queues and multiple output queues.

9. The device of claim 7, wherein the scheduler is further configured to maintain a first datagram in first datagram out ordering for datagrams sharing an input queue and an output queue.

10. The device of claim 7, wherein the scheduler is further configured to instruct the packet threads regarding what work the processor should perform.

11. The device of claim 7, further comprising:
    a plurality of inter-thread communicators configured to provide communication between the scheduler and the packet threads.

12. The device of claim 11, wherein the inter-thread communicators are mailboxes.

13. The device of claim 11, wherein the scheduler communicates to the packet threads to determine which datagram the packet thread processes.

14. The device of claim 11, wherein the processor is further configured to communicate with the scheduler regarding the packet thread's processing state.

15. The device of claim 8, the input queue includes a packet counter that is incremented to indicate receipt of a new datagram.

16. The device of claim 7, further comprising:
    a plurality of microengines,
    one or more memories, and
    one or more buses.

17. The device of claim 7, further comprising: at least one link layer device.

18. A method of parallel processing of a datagram sequence, the method comprising:

receiving a plurality of datagrams into a plurality of input queues, each datagram in the plurality of datagrams having a location relative to other input datagrams in the input queue;

scheduling a particular datagram of the plurality of datagrams from an input queue in the plurality of input queues, wherein the scheduling includes:

prior to processing the datagram, computing an output position in an output queue the output position corresponding to an output location in the output queue that ranks the datagram ahead of a datagram in the output queue that was ranked in the input queue behind the datagram, and such that the output position ranks the datagram behind a datagram in the output queue that was ranked in the input queue ahead of the datagram;

assigning the datagram to a first thread to process, the first thread being in a plurality of processing threads, where assigning includes specifying the computed output position;

processing the datagram using at least one of the plurality of processing threads; and after processing the datagram, outputting the processed datagrams in an order that is different from the order in which the datagrams were input for processing; and storing the datagram in the output queue at the output position.

19. The method of claim 18, wherein the scheduling maintains a first in; first out order for datagrams sharing an input and output interface pair.

20. A machine-readable medium that stores executable instructions for processing datagrams, the instructions for causing a machine to:

execute a scheduling thread to communicate with a plurality of processing threads, to schedule processing of the datagram, assign the datagram to one of the plurality of threads for processing, and prior to processing the datagrams, specify locations in an output queue for the results from processing of the datagrams, the output queue being shared by the plurality of processing threads, wherein the location in the output queue is based on the input location of the datagram among the plurality of datagrams, and process the datagram using at least one of the plurality of processing threads;

output the processed datagrams in an order that is different from the order in which the datagrams were input for processing; and store the datagram in the output queue based on the specified location.

21. The machine-readable medium of claim 20, wherein the datagram has an input location among a plurality of datagrams in an input queue.

22. The machine-readable medium of claim 20, wherein the output position corresponds to an output location among a plurality of datagrams in the output queue.

23. The machine-readable medium of claim 20, wherein the scheduling maintains a first in; first out order for datagrams sharing an input and output interface pair.

24. The machine-readable medium of claim 20, wherein communicating is inter-thread by a mailbox.

25. The machine-readable medium of claim 20, further comprising instructions that cause the machine to:

incrementing a packet counter to indicate receipt of a new datagram.

26. A system of parallel processing of a datagram sequence in a router, comprising:

at least one physical layer device;

at least one Ethernet medium access control coupled to the at least one physical layer device;

at least one network processor configured to process datagrams output by the Ethernet medium access control, the network processor including multiple microengines configured to provide a collection of threads, the threads including:

a scheduler thread configured to assign datagrams to processing threads and to calculate an output position in the output queue prior to processing the datagrams, wherein the output position in the output queue is based on an input order of the plurality of datagrams, and multiple packet processing threads configured to receive the datagram from a input queue, at least one the packet processor configured to:

process the datagram, and dispatch the datagram to the output position in the output queue specified by the scheduler thread, wherein the order in which the datagram is dispatched to the output queue is different from the order in which the datagram were input for processing.

* * * * *